INVENTORS.
WILLIAM P. OEHLER
ARTHUR J. IMMESOETE
BY
ATTORNEYS

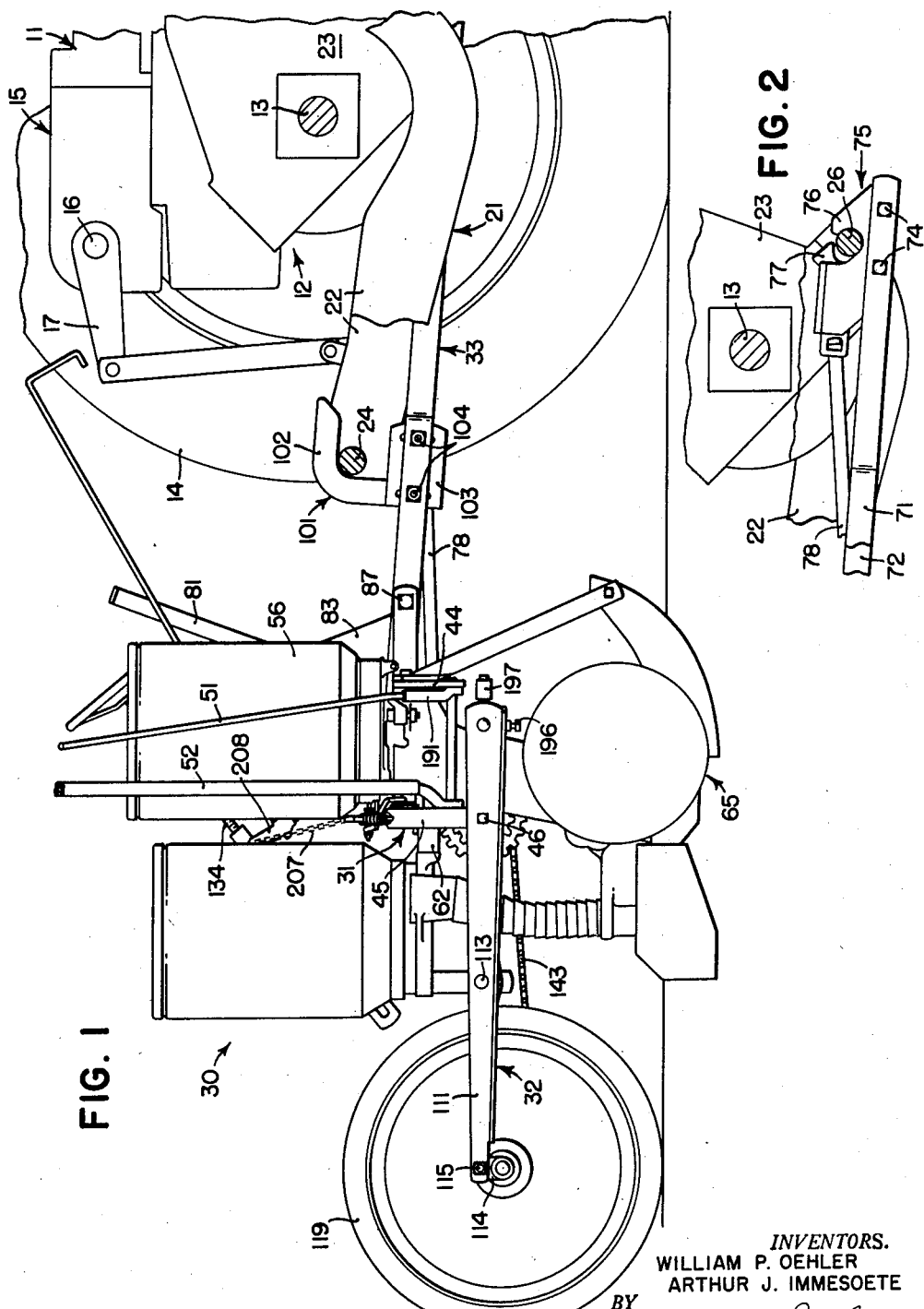

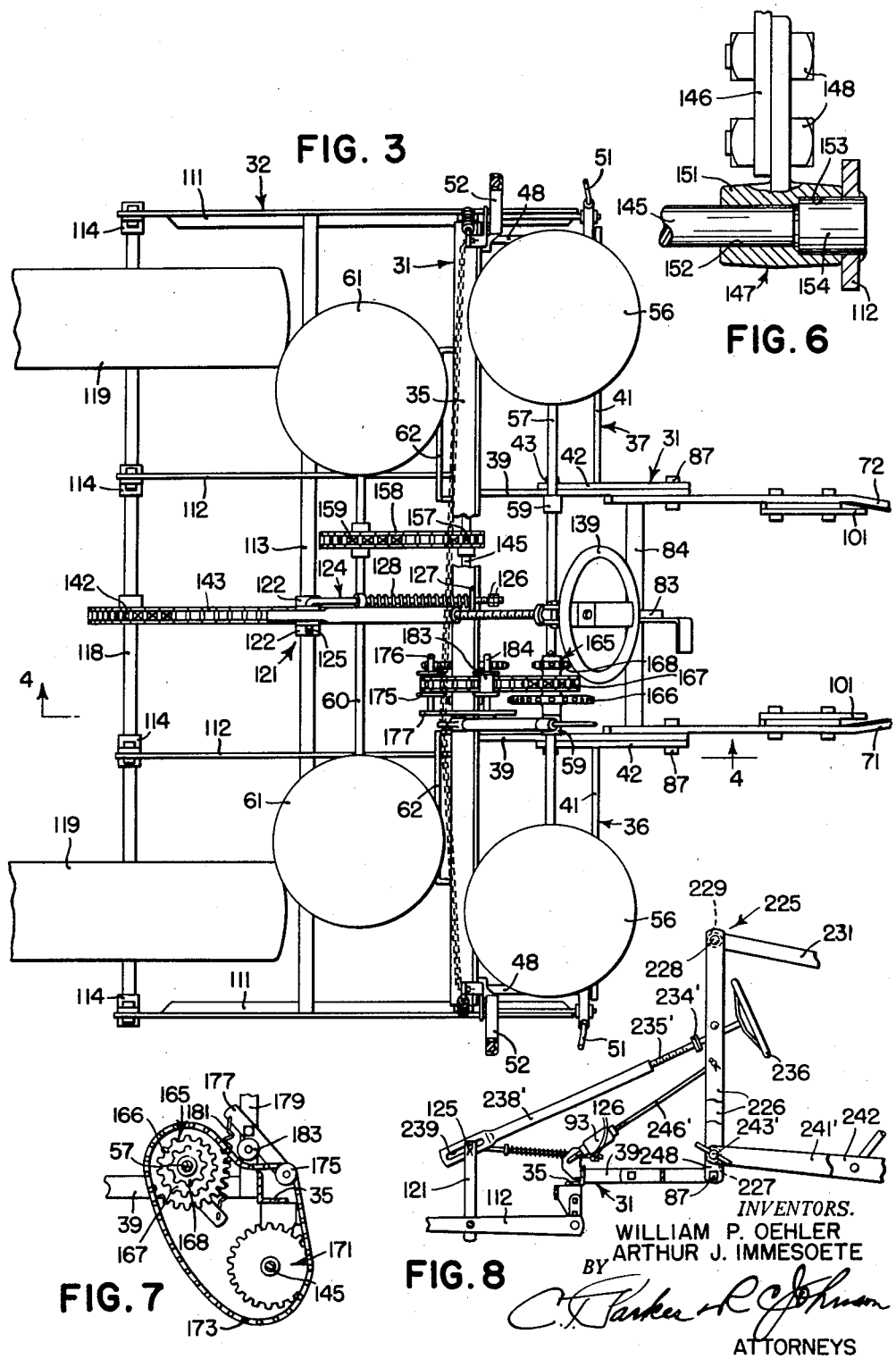

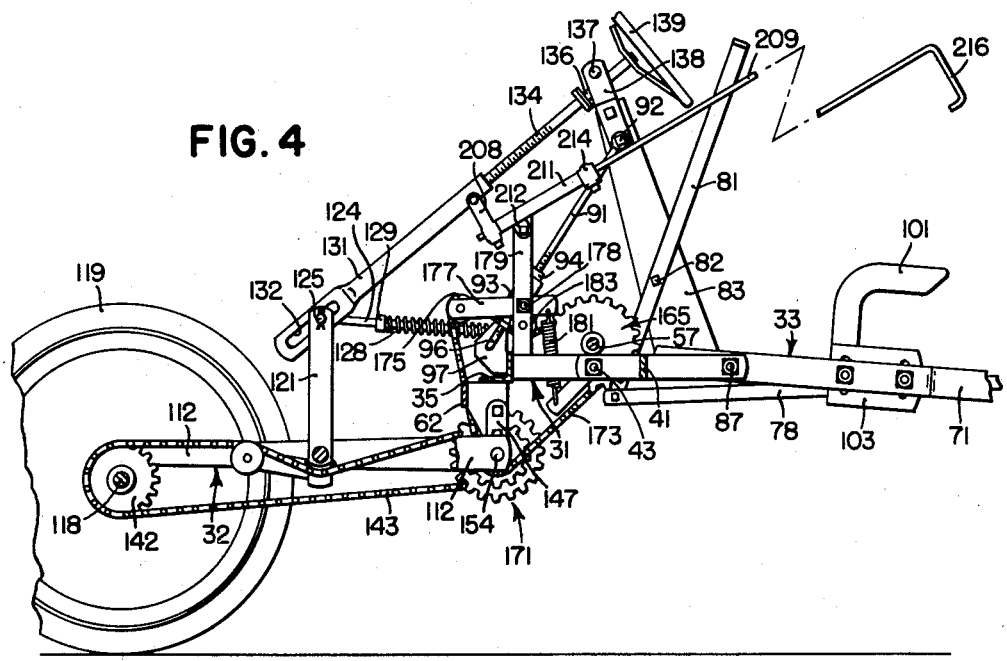
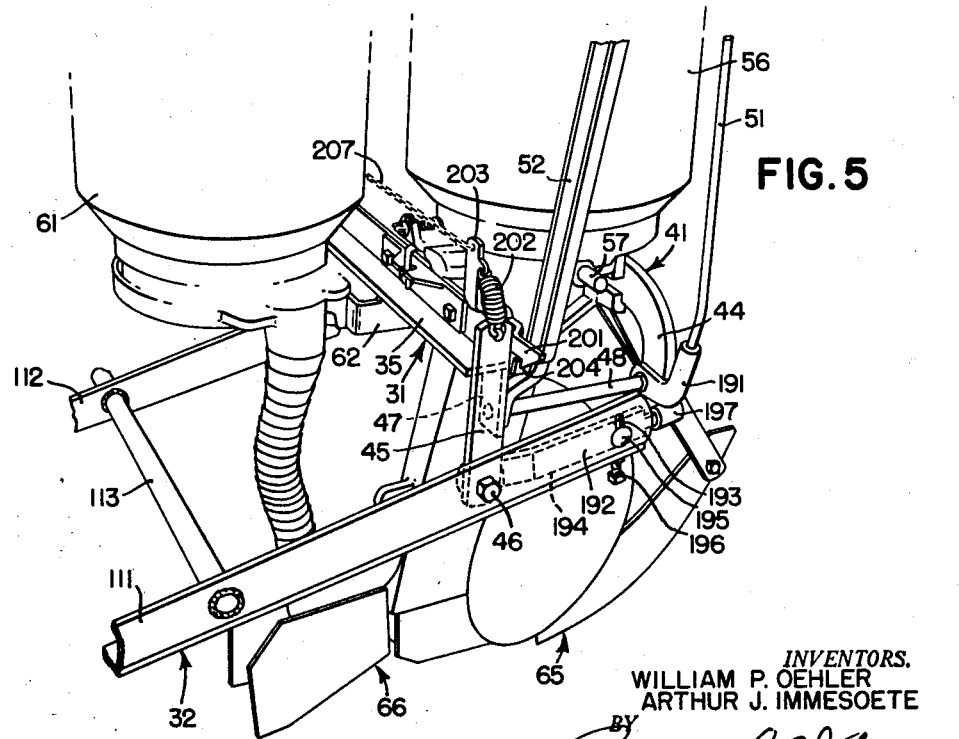
INVENTORS.
WILLIAM P. OEHLER
ARTHUR J. IMMESOETE
ATTORNEYS

United States Patent Office 2,917,117
Patented Dec. 15, 1959

2,917,117

TRACTOR-MOUNTED PLANTER

William P. Oehler and Arthur J. Immesoete, Moline, Ill., assignors, by mesne assignments, to Deere & Company, a corporation of Delaware Application September 14, 1953, Serial No. 380,012

3 Claims. (Cl. 172—414)

This application is a continuation-in-part of our co-pending application, Serial No. 211,712, filed February 19, 1951, now Patent No. 2,728,313, issued December 27, 1955, for Tractor-Mounted Planter.

The present invention relates generally to agricultural implements and more particularly to planting implements, such as cotton and corn planters.

The object and general nature of the present invention is the provision of a planter of the tractor-mounted type in which provision is made for rapid and convenient attachment of the planting implement to and disconnection from the tractor. Further, it is an important feature of this invention to provide new and improved marker means whereby raising the planter into a transport position automatically effects the raising of the marker arm that immediately previously has been in lowered or operating position. More specifically, it is a feature of this invention to provide a tractor-mounted planter with a pivoted press wheel frame so constructed and arranged that the movement of the press wheel frame relative to the main frame of the planter, when the latter is raised into a transport position, automatically effects the raising of the marker arms. Also, it is a feature of the present invention to provide means for driving the seeding mechanism from the press wheels carried by the pivoted press wheel frame, and new and improved means for transmitting the drive from the press wheel axle to the seeding shaft through a jackshaft that is disposed in axial alignment with the pivot axis about which the press wheel frame moves relative to the main frame. An additional feature of this invention is the provision of a new and improved drive between the jackshaft, driven by the press wheels, and the seeding shaft on the main frame of the planter.

Another important feature of the present invention is the provision of a lift-type planter, that is a planter of the type that is adapted to be connected with a tractor having a power lift system whereby, through proper operation of the tractor power lift mechanism, the planter may be lifted bodily for transport as a unit with the tractor. In this connection, it is an additional feature of the present invention to provide an automatic marker control means which is so constructed and arranged that, at the option of the operator, either one or the other of the marker arms may be raised automatically into a latched position whenever the implement is raised into a transport position, or, if the operator so desires, both markers may be raised automatically, whenever the implement is lifted, into what might be termed a middle position, in which the markers are lifted off the ground but not raised far enough to be automatically engaged by the associated latches. In the latter arrangement, both markers are lowered whenever the implement is lowered into operating position, then when the end of the field is reached and the operator turns the outfit around to travel in the other direction, the marker arms are both raised approximately half way by the raising of the implement, and then after the turn is completed and the planter lowered into operating position, both markers are automatically lowered. Thus, the operator is not required to manually drop one or the other of the marker arms, as in the first-mentioned arrangement. Planting with both marker arms down has a further advantage that the marker arm that traverses the previously planted ground follows the previously made marker arm furrow in the ground, and therefore by seeing that the marker arm at that side of the outfit follows along the previously made marker arm furrow, the outfit is maintained in proper spacing relative to the previously planted rows.

Still further, another feature of this invention is the provision of a new and improved hitch frame particularly adapting the planter of the present invention to tractors having a three-point hitch system.

These and other objects and advantages of the present invention will be apparent to those skilled in the art after a consideration of the following detailed description, taken in conjunction with the accompanying drawings in which:

Fig. 1 is a side view of a tractor-mounted planter in which the principles of the present invention have been incorporated.

Fig. 2 is a fragmentary view showing the connection between the front portion of the hitch frame of the planter and the tractor.

Fig. 3 is a plan view of the principal portions of the planter shown in Fig. 1.

Fig. 4 is a sectional view taken generally along the plane of the line 4—4 of Fig. 3.

Fig. 5 is a fragmentary perspective view showing marker controlling mechanism.

Fig. 6 is a detail view showing the support of the jackshaft and the connection between the press wheel frame and the main frame for movement about an axis coinciding with the axis of the jackshaft.

Fig. 7 is a fragmentary detail view showing the mounting by which the drive between the jackshaft and the seeding shaft may be adjusted to secure a different driving ratio.

Fig. 8 is a side view of a modified form of the present invention.

Figure 9:
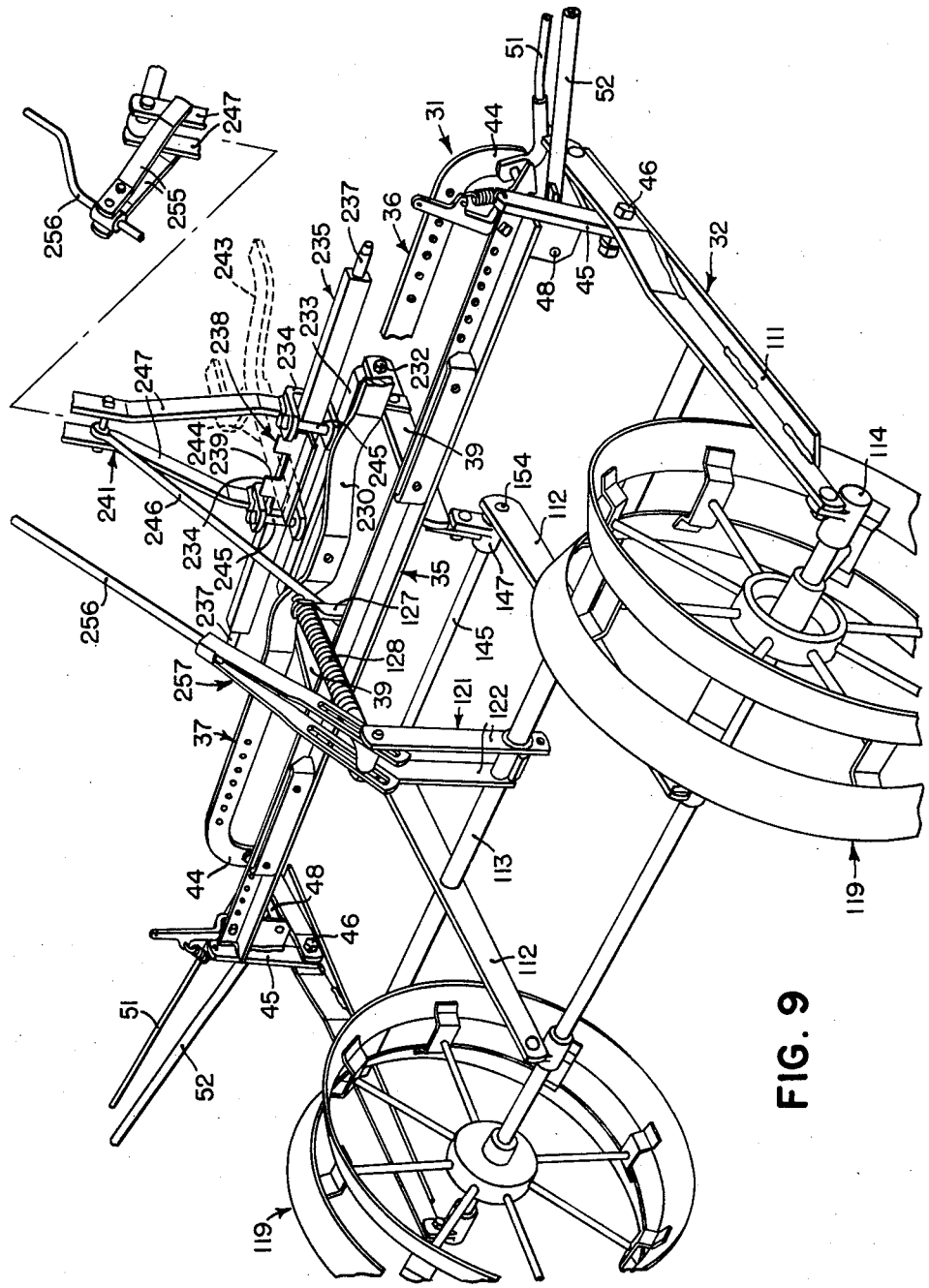
Fig. 9 is a fragmentary perspective view illustrating the action of the pivoted press wheel frame in raising both markers to their partially raised position.

Referring first to Figs. 1 and 2, the planter of the present invention is shown as mounted on a tractor 11 which, so far as the present invention is concerned, is largely conventional. The tractor 11 includes a rear axle structure 12 rotatably receiving a pair of axle shafts 13 on the outer ends of which rear traction wheels 14 are fixed. The rear axle structure 12 carries a power lift unit 15 actuated by a hydraulic pump driven by the tractor motor, the power lift unit 15 including a transverse rockshaft 16 on the ends of which power lift arms 17 are mounted. The tractor 11 also includes a vertically swingable drawbar structure 21 which is pivotally connected at the forward ends of the side arm portions 22 of the drawbar 21 to the drop housings 23 which form a part of the rear axle structure 12. The side portions 22 of the tractor drawbar 21 are interconnected at their rear ends by a rear drawbar member 24. Also carried by the drop housings 23 of the tractor, and preferably coincidental with respect to the transverse axis about which the drawbar 21 is swingable generally vertically, is an implement-receiving member 26 extending generally transversely underneath the rear portion of the tractor.

The planter in which the principles of the present invention have been incorporated is indicated in its entirety by the reference numeral 30 and includes inter alia a main frame 31, a press wheel frame 32, and a hitch frame 33. The main frame 31 comprises a transverse frame member in the form of an angle 35, a pair of right- and left-hand front frame members 36 and 37 and a pair of generally fore-and-aft extending bars 39. The right- and left-hand front frame members 36 and 37 are of similar construction, each including a laterally outwardly extending bar section 41 secured at its laterally inner end, as by welding, to a fore-and-aft extending attaching section 42, the latter section and the adjacent portions of the associated fore-and-aft extending bar 39 being apertured to receive connecting bolts 43. The laterally outer end of each of the front frame bars 41 is provided with a downwardly turned, apertured bracket section 44, and fixed to each of the laterally outer ends of the rear frame angle 35 is a depending bracket section 45. The lower end of each bracket section 45 is apertured to receive a pivot member 46 on which the associated outer frame member of the press wheel frame 32 is pivotally mounted, as will be referred to later in detail. Each bracket 45 includes an auxiliary section 47 which is apertured so as to provide an opening in alinement with the opening in the lower downturned portion 44 of the front frame bar 41. Disposed in each pair of openings is a shaft member 48 to which the inner ends of the front and rear marker arm sections 51 and 52 are fixed. Each pair of marker arm sections 51 and 52 forms a part of a marker arm which per se is of conventional construction except as to the means by which the press wheel frame 32 controls the marker arms, as will be referred to in detail later. The main frame 31 is arranged to carry a pair of seed hoppers 56, each of which includes in the lower portion thereof seed dispensing mechanism which is driven by a transversely disposed seeding shaft 57. The shaft 57 extends across the planter and has its outer ends supported in the bottom portions of the hoppers 56, the generally central portions of the seeding shaft 57 being carried in bearing brackets 59 fixed to the fore-and-aft extending frame bars 39. The main frame 31 is also adapted to support a pair of fertilizer hoppers 61, in the lower portion of which is fertilizer distributing mechanism, conventional so far as the present invention is concerned. Each fertilizer distributing mechanism is driven by a transverse fertilizer drive shaft 60 which at its outer ends is carried in the lower portions of the hoppers 61. Each hopper 61 is bolted to a transversely disposed, hopper-receiving bracket 62, as by bolt means or the like, inserted in selected holes formed in the hopper-supporting brackets 62. The seed hoppers 56 are likewise laterally adjustable along the main frame angle 35, together with their associated furrow openers 65. The latter units also carry fertilizer furrow openers 66 into which fertilizer, distributed by the distributing mechanism in the hoppers 61, is discharged under the control of suitable gate mechanism (not shown).

The main frame 31, together with the press wheel frame 32, described below in detail, is adapted to be connected with the tractor 11 through the forwardly extending hitch frame 33. The latter includes a pair of generally fore-and-aft extending, forwardly converging frame bars 71 and 72, the forward converged portions of the bars 71 and 72 being disposed generally in parallelism and interconnected together by bolt means 74, which means also secures a latch unit 75 to the front ends of the hitch frame bars 71 and 72. The latch unit 75 includes a forward hook section 76 and a fore-and-aft shiftable detent member 77 which is biased by suitable spring means for forward movement into engaging position with respect to the tractor-carried transverse hitch bar 26. The detent 77 is controlled by a fore-and-aft extending member 78 which at its rear end is connected to the lower end of a manually operated lever 81 pivotally mounted, as at 82, on a vertically extending standard 83 which at its lower end is secured, as by welding, to a transverse bar 84 the laterally outer ends of which are fixedly secured, as by welding, to the rear ends of the hitch frame bars 71 and 72, as best shown in Figure 3.

The main frame 31 is pivotally connected with the hitch frame 33 for generally vertical movement relative thereto about a transverse axis defined by a pair of pivot bolts 87. The bolts 87 are extended through openings formed in the forward portions of the fore-and-aft extending frame bars 39, the bolts 87 also extending through openings formed in the forward portions of the associated front frame attaching sections 42. The position of the main frame relative to the hitch frame is controlled by means of a generally vertically extending adjusting rod 91 pivotally connected at its upper end, as at 92, to the upper portion of the standard 83. The lower end of the rod 91 is threaded and is extended into a turnbuckle sleeve 93, being fixed with respect to the latter by means of a lock nut 94. The lower end of the turnbuckle sleeve 93 receives the upper threaded end of a lower rod member 96, the lower end of which is pivoted to a bracket 97 that is fixed to the generally central portion of the main frame angle 35, as best shown in Figure 4. A lower lock nut serves to fix the lower rod member 96 relative to the turnbuckle sleeve 93. Turning the latter, after the lock nuts 94 have been loosened, provides for adjusting the position of the main frame of the planter relative to the hitch frame 33, and thus provides means for leveling the furrow openers 65 and 66 in a fore-and-aft direction, thereby adjusting the position of the front end of the hitch frame 33 for connection to any one of several different tractors. Adjustment of the front end of the hitch frame 33 when the furrow openers are leveled is desirable so as to provide means whereby the planter may be connected to the draft bars 26 of different tractors in which the draft bars 26 may be disposed at different heights above the ground.

The draft or hitch frame 33 carries a pair of hook members 101 which are adapted to be engaged over the transverse member 24 of the tractor drawbar 21. Each hook member 101 includes a vertically disposed, generally L-shaped member 102 secured at its lower end to an adjustable plate 103 which is provided with a plurality of apertures, receiving a pair of attaching bolts 104 and providing means whereby the vertical position of each attaching member 101 may be varied as desired. Preferably, the parts 101 are so adjusted as to provide some lost motion vertically between the transverse drawbar member 24 and the hitch frame 33, thereby providing for some floating or relatively free vertical movement between the planter unit and the drawbar of the tractor, which normally is fixed against movement, at least downwardly, relative to the tractor by the lift arms 17. This lost motion also provides means whereby the planting unit may tip laterally in one direction or the other and to a limited extent, as determined by the positions of the hook members 101 on the hitch frame 33.

Referring now to the press wheel frame 32, pivotally connected with the main frame 31, the press wheel frame 32 comprises a pair of laterally outer, generally fore-and-aft extending frame angles 111 and a pair of generally fore-and-aft extending laterally inner frame bars 112. The bars 111 and 112 are rigidly secured, as by welding, to a transverse reenforcing shaft section 113 and the forward portions of the laterally outer bars 111 are apertured to receive the pivot members 46 (Figure 5) mentioned above. The rear end of each of the press wheel frame bars 111 and 112 carries a bearing bracket 114, each preferably being secured to the associated frame bar by suitable bolt means 115. The bearing portions of the brackets 114 are disposed in transverse alignment and rotatably receive a press wheel shaft 118 to which the press wheels 119 are securely fixed, as by any suitable means. Preferably, the press wheel 119 at each side of the implement is disposed between the frame bars 111 and 112 at that side of the tractor.

Rigidly secured to the central portion of the reenforcing shaft section 113 is a vertically extending standard 121, preferably comprising a pair of vertically extending strap members 122, the lower ends of which are welded to the shaft section 113 and the upper ends of which are apertured to receive the laterally turned end 125 of a control rod 124, the forward end of which is threaded and extended through an aperture in a vertically extending portion 127, which forms a part of the bracket 97 that receives the main frame adjusting rod 91, 96. A spring 128 is disposed about the press wheel control rod 124 and disposed between the rear face of the bracket 127 and the forward face of an adjustbale set screw collar 129 carried by the rod 124. Preferably, the parts are arranged so that the spring 128 exerts a continual bias tending to swing the press wheel frame downwardly, or in a counterclockwise direction as viewed in Figures 1 and 4, relative to the main frame of the planter. The downward movement of the press wheel frame in this direction is, however, limited by virtue of the contact between the lock nuts 126 and the forward side of the bracket 127. Disposing the adjustable collar 129 in various positions along the rod 124 serves to control the tension exerted by the spring 128. Movement of the press wheel frame 32 relative to the main frame 31 is limited by means of a strut member 131, the lower portion of which is flattened and slotted, as at 132, the rod end 125 being extended through the slot 132. The upper portion of the member 131 is internally threaded to receive a threaded adjusting rod 134, the upper portion of which is extended through and held against axial displacement relative to a sleeve member 136 swiveled, as by a pair of trunnions 137, in a bracket 138 that is fixed to the upper end of the hitch frame standard 83. The upper or forward end of the adjusting rod 134 carries a hand wheel 139 by which the rod 134 may be rotated to adjust the position of the slotted member relative to the main frame 31 and the hitch frame 33.

A sprocket 142 is fixed to the central portion of the press wheel shaft 118 and receives a driving chain 143 which at its forward portion is trained over a sprocket (not shown) carried by a jackshaft 145. The jackshaft 145 is carried by the main frame in transverse axial alignment with the pivots 46 by which the laterally outer frame members 111 of the press wheel frame are swingably connected for generally vertical movement relative to the main frame 31. To this end, as best shown in Figure 6, the main frame angle 35 is provided with a pair of depending brackets 146 disposed generally centrally of the main frame and arranged in laterally spaced apart relation. The lower end of each bracket 146 receives a bearing member 147 secured to the bracket 146 by any suitable means, such as a pair of connecting bolts 148. Each bearing 147 includes a transversely disposed sleeve section 151 having a socket 152 at its laterally inner end adapted to rotatably receive the associated end of the jack shaft 145. Also, each bearing member 147 is provided with a laterally outwardly extending socket 153 adapted to rockably receive a trunnion 154 fixed, as by welding, in an opening formed in the associated laterally inner press wheel frame member 112. The sockets 152 and 153 are disposed in axial alignment with one another and with the corresponding sockets at the other side of the press wheel frame, the bearing members 147 disposing the jackshaft 145 in axial alignment with the press wheel frame pivot members 46. The jackshaft 145 is freely rotatable within the bearing members 147 but is held against lateral displacement in either direction within the sleeves 151 by the press wheel frame trunnions 154.

The jackshaft is rotated from the press wheel shaft 118 by the driving chain 143, as described above, and the jackshaft 145 carries a sprocket 157 which drives a chain 158 trained over a sprocket 159 fixed to the fertilizer shaft 60, whereby the latter is driven from the press wheel shaft 118. Secured to the seeding shaft 57, as by any suitable means, is a compound sprocket gear member 165 having three sprocket sections 166, 167 and 168 of varying diameter, as best shown in Figure 3. A second compound sprocket gear member 171 is mounted for axial movement along the jackshaft 145 but is connected to rotate with the jackshaft 145 by any suitable means such as a keyway in the jackshaft and a projection on the gear member 171 extending into the keyway. The gear member 171 is shiftable axially along the jackshaft into different positions and is held in any selected position by any suitable means, such as a ball detent or the like. A driving chain 173 is adapted to be trained over selected sprocket sections and is of sufficient length that it may be trained over the largest sprocket section of each of the compound sprocket members. In order, however, to keep the driving chain 173 tight, the chain is trained over an idler roller 175 carried on a shaft 176 fixed to the outer end of a pivoted idler arm 177, the latter being pivotally connected, as by a pivot bolt 178, to a vertically extending arm 179 that is fixed, as by welding, at its lower end to the main frame angle 35, as best shown in Figure 4. A spring 181 is connected between the main frame and the forward end of the idler arm 175, the spring 181 serving to swing the rear end of the idler arm 175 upwardly so as to maintain the upper run of the driving chain 173 tight at all times. However, if it should be desired to change the driving ratio between the jackshaft 145 and the seeding shaft 57, all that it is necessary to do is to manually depress the idler arm 177 a distance sufficient to permit the chain 173 to be disengaged therefrom, and then move the shiftable gear member 171 along the shaft 145 into the selected position. The chain 173 is of sufficient length that it may, without adding or taking out any of the links, be disposed for driving connection about any one of the sprocket sections of each of the sprocket members 165 and 171. Similarly, the arm 175 is of sufficient length that it is enabled to keep the upper run of the driving chain 173 tight even though it be disposed or entrained around the smallest sprocket of each of the sprocket members 165 and 171. In addition to the idler roller 175, the upper run of the chain 173 is trained over an idler roller 183 journaled on a stub shaft 184 carried by the vertical bar 179 just below the pivot member 178 (see Figure 4) on which the idler arm 175 is mounted.

It was mentioned above that vertical swinging of the press wheel frame 32 relative to the main frame 31 is utilized for controlling the marker arms. Referring now to Figure 5, it will be noted that an angled cam member 191 is fixed to each marker arm section 51 adjacent or at its point of connection with the marker arm shaft 48. Each end of the laterally outer press wheel frame angles 111 is extended forwardly, as at 192, and is slotted, as at 193, to receive a marker controlling arm 194 adjustably mounted on each press wheel frame member 111. Preferably, the rear end of the marker control arm 194 is apertured to receive the associated pivot member 46 and carries a clamping bolt 195 that is extended through the slot 193. A set screw abutment member 196 is carried at the forward end of each press wheel frame member 111 and serves as a lower stop for the marker control arm 194. The forward end of the latter is rounded so as to receive a roller 197 which underlies the cam member 191 on the associated marker arm section 51. When the press wheel frame 32 swings downwardly, relative to the main frame 31, either or both of the marker arms will be raised, by virtue of the upward movement of the marker control arms 194 acting against the associated cam members 191. When the marker arms reach their raised position, a latch 201, biased for downward movement by a spring 202 which acts between the upper end of the associated bracket 45 and an arm section 203 of the latch 201, so that when the marker arm reaches its uppermost position the nose of the latch 201 engages over a lug 204 carried by and fixed to the inner end of the marker arm section 52. Each of the upwardly extending latch arms 203 is apertured to receive the laterally outer end of a controlling chain 207, the central portion of which is anchored to an arm 208 which is fixed to a rockable rod member 209. Preferably, the arm 208 is clamped by any suitable means to the lower or rear end of the rod 209, the lower end being rockably mounted in a sleeve 211 that is adjustably fixed, as at 212, to the upper end of the bracket 179. At its upper end the sleeve 211 is disposed to receive a set screw collar 214 which is fixed to the rod 209 and thus, acting with the clamping arm 208, the collar 214 holds the rod 209 in position. The forward end of the rod is formed as a handle 216. Since the upper end of the arm 208 is connected to the central portion of the chain 207, swinging the handle 216 in one direction or the other, laterally of the planter, will result in disengaging one or the other of the latches 201 from the associated marker arm, which permits the latter to swing downwardly into operating position, providing the planter itself has been lowered into its operating position with the weight of the rear portion of the implement sustained on the press wheel frame 32 and the associated press wheels 119. When the weight of the implement is so imposed, the press wheel frame 32 is, in effect, swung upwardly relative to the main frame of the planter, and this results in a lowering of the marker arm control rollers 197, the latter taking the position shown in Figure 1 spaced from the associated marker arm and its controlling cam 191. It will be understood from Figure 4, that when the planter is lowered into an operating position, with the weight of the planter, at least the rear portion thereof, supported on the press wheels 119, the rear end 125 of the rod 124 moves into a position adjacent the upper or forward end of the slot 132, but not necessarily against the upper end of said slot, since the spring 128 is designed to resiliently support the main frame on the press wheel frame in operation so as to provide for substantially constant pressure of the press wheels 119 against the surface of the ground while permitting a limited amount of up-and-down movement of the furrow openers, whereby the implement is enabled to operate over relatively uneven ground.

In operation, when it is desired to raise the implement for transport, or for turning at the ends of the rows, the tractor power lift 15 is actuated to swing the lift arms 17 upwardly. This raises the tractor drawbar 21 and, acting through the hook members 101, raises the interconnected hitch and main frames of the planter. As the latter is lifted, the weight of the press wheel frame, together with the press wheels themselves and associated parts, and also aided by the force exerted by the spring 128, becomes effective to swing the press wheel frame, relative to the main frame, in a generally counterclockwise direction as viewed in Figures 4 and 5. This causes the forward ends of the press wheel frame members 111 to be elevated, whereupon the rollers 197 are raised. Thus, the marker arm that previously was lowered and in operating position is therefore automatically raised into an inoperative or transport position, and when that arm reaches its transport position, the latch 201 associated therewith will automatically engage the lug 204 and hold the arm in its uppermost position even though the press wheel frame should again be raised, relative to the main frame, as by lowering the planter again into an operating position. However, the operator by swinging the handle 216 in one direction or the other may select whichever one of the marker arms he desires to drop into operating position. By loosening the bolt 195 and turning the abutment bolt 196 in one direction or the other, the marker arm actuating members 194 may be adjusted so as to insure that the downward movement of the press wheel frame relative to the main frame will always lift the associated marker arms into a position to be locked by the latches 201.

As mentioned above, either or both of the marker arms will be raised by virtue of the upward movement of the marker control arms 194 that are carried at the forward end of each press wheel frame member 111. If desired, the weight of the press wheel frame and associated parts and/or the tension of the spring 128, may be arranged so that when both marker arms are down and the implement is raised, the press wheel frame and associated parts can exert sufficient force only to raise the marker arms about half way but not far enough for the marker arms to be engaged by the latches 201, although if one marker arm is already raised, then the press wheel frame and associated parts can exert sufficient force to raise the other marker arm into its completely raised position, in which it is locked by the associated latch 201. Where one or the other of the marker arms is raised into its completely latched position, the other marker arm is raised automatically when the outfit is lifted into its transport position, as to make a turn at the end of the field. In that case, the operator can select the marker arm to be lowered for the next trip across the field. However, some farmers prefer not to have to bother with selecting the marker arm to be lowered at each time the implement is turned at the end of the field, and in that respect the present invention provides means whereby both marker arms are arranged automatically by the operation of the press wheel frame but the marker arms are not raised sufficiently to be latched. Therefore, the farmer can operate with both the marker arms down when planting, utilizing the idle marker arm as a guide for following accurately the marker arm furrow formed on the previous round. Then when the end of the field is reached, the farmer merely raises the implement, which also raised the marker arms about half way, turns around and then drops the planter into operating position, which automatically drops both marker arms. In this way, the operator is not required to select the marker arm to be lowered for the next trip across the field. manipulating the tractor during the turn-around at the end of the field. Fig. 9 illustrates the position of the parts when the marker arms are raised about 30 to 40 degrees off the ground, but not enough to be engaged by the control latches.

When it is desired to have both marker arms latched in their fully raised position, all that the operator has to do is to manually lift one of the marker arms into its latched position, whereupon the weight of the press wheel frame and associated parts is sufficient then to raise the other marker arm into its completely lifted position.

Referring again to the form of invention shown in Figs. 1–7, when it is desired to disconnect the implement from the tractor, all that it is necessary to do is to swing the hand lever 81 forwardly, which withdraws the hitch detent 77, and then by lowering the tractor drawbar, the front end of the hitch frame drops down a distance sufficient to permit the draft part 26 to pass forwardly over the draft hook 76 (Figure 2), and since the transverse member 24 of the tractor drawbar 21 is free to pass forwardly out of engagement with the lifting hook members 101, the tractor may then be driven forwardly away from the implement. In order to insure that the front end of the hitch member or hitch frame 33 may swing downwardly a distance sufficient to disengage the latch 75 from the draft part 26, the slot 132 is of such length as to accommodate a limited amount of up-and-down movement of the forward end of the draft or hitch frame 33.

In Fig. 8, a modified form of the present invention is shown. According to this form of the invention, the planter frame 31 is shown as connected to a hitch structure 225 which includes a pair of vertically disposed members 226 secured, as by welding, at their lower ends to a crossbar 227. At their upper ends, the bars 226 are apertured to receive a pin 228 that is adapted to extend through the ball joint 229 carried at the rear end of an upper compression link 231 which forms the upper part of an implement-connecting linkage known as the Ferguson system and shown in the patent to Ferguson 2,118,181, dated May 24, 1938. In this system, the connection between the implement and the tractor includes the upper link just mentioned and two lower tension links, each link being connected with the tractor through universal or ball joints, and each link including at its rear end a ball and socket device. Intermediate the vertical members 226, the latter are apertured to receive the trunnions of a swivel member 234' in which a screw-threaded shaft 235' is rotated. The forward end of the shaft 235' carries a hand wheel 236 and the rear end of the threaded shaft 235' is received within the screw-threaded nut section of a tubular strut 238', the rear end of which is slotted, as at 239', and is adapted to receive the pivot connector 125 (see Fig. 4) on the press wheel frame of the planter. The two lower links of the Ferguson system are indicated by the reference numerals 241' and 242, and the lower hitch bar 227 carries suitable pin means 243' which are adapted to be inserted through the balls at the rear ends of the Ferguson links 241' and 242. A planter frame adjusting rod 246' is connected between the vertical bars 226 and the turnbuckle sleeve 93 of the planter, whereby the angular position of the planter frame relative to the vertical hitch structure 225 may be adjusted as desired. The transverse bar 227 carries depending lugs 248 which are arranged in spaced apart relation and are apertured at their lower ends to receive the pivots 87 by which, in the form of the invention shown in Figs. 1–7, the hitch frame 33 is pivotally connected with the forward bars 39 of the planter frame.

The operation of the form of the invention shown in Fig. 8 is substantially the same as described above in connection with Figs. 1–7. When the links 241 and 242 are raised to raise the implement into a transport position, the downward movement of the press wheel frame relative to the planter frame serves to raise whichever one of the markers that immediately preceding was in its lowered position.

Referring again to Fig. 9, this figure illustrates a further modified form of hitch device that, according to the principles of the present invention, may be used in place of the hitch frame 33 described above. In this form of the invention, the planter frame members 36 and 37 are rigidly interconnected by a center member 230 and the forward ends of the frame sections 39 are pivotally connected, as at 232, to the ends of a transverse yoke member 233 to the upper face of which a pair of laterally spaced apart socket members 234 are welded. The open portions of the socket members 234 face rearwardly and are adapted to receive the central portion of a transverse drawbar member 235 that is polygonal, preferably square, in cross section. The ends of the bar 235 are reduced, as at 237, to receive the connectors at the rear ends of the two lower links of a conventional three-link system. An angle member 238 having a notch 239 is fixed, as by welding, to the central portion of the bar 235 and acts to center the latter between the socket members 234.

A mast section 241 is fixed to the socket members 234 at their upper sides and extend upwardly generally directly above the notch 239. The tractor may carry a sway prevention bracket 243, the rear arm 244 of which is adapted to be disposed within the notch 239, acting through the horizontal flange of the member 238 and the associated pair of locking pins 245 to prevent lateral displacement of the planter relative to the tractor. The upper end of mast section 241 is connected by a brace rod 246 with the rear frame bar 35 of the planter. The upper portion of the mast section 241 is made up of a pair of upwardly converging bars 247 that are spaced apart at their upper ends to receive a connector 251 by which the rear portion of the upper link 252 of the associated tractor hitch system may be connected with the hitch unit 241. The distance vertically between the upper and lower limbs of the U-shaped socket members 234 is greater than the corresponding dimension of the square bar 235, and similarly the fore-and-aft distance between the socket members 234 and the lock pins 245 is greater than the corresponding dimension of the square bar 235. Therefore, the latter is capable of both lateral and vertical swinging relative to the implement structure. An extension 255 is secured, as by welding, to the upper end of the bar 247 and receives the forward portion of an adjusting crank rod member 256. A rear member 257 adjustably receives the rear threaded end of the rod 256 and the member 257 is slotted to receive the pin carried by the upwardly extending arm 121 that is fixed to the press wheel frame shaft or frame member 113.

In this form of the invention, as illustrated in Fig. 9, the press wheel frame and associated parts, together with the spring 128, is capable of exerting force sufficient only to raise both marker arms about half way, with the advantages enumerated above.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. An agricultural implement having a hitch frame with a lower portion adapted to be connected with a tractor and a vertical standard fixed rigidly to the lower portion adjacent the rear of the latter, a main frame connected at its forward portion to said lower hitch frame portion adjacent the lower part of said standard, brace means connecting the rear portion of the main frame to said standard above the lower portion thereof, a press wheel frame swingably connected with the rear portion of the main frame, and means acting between said standard above the lower portion thereof and said press wheel frame for limiting swinging movement of the press wheel frame relative to the main frame, said last mentioned means including lost motion means accommodating a limited amount of movement of the press wheel frame relative to the main frame.

2. An implement as defined in claim 1, further characterized by an upstanding standard fixed to said press wheel frame, and generally horizontally disposed resilient means acting between said upstanding standard and main frame for urging the press wheel frame generally downwardly to the extent permitted by said lost motion means.

3. A planter of the type adapted to be connected with a tractor having a power lift and an implement-connecting linkage that includes an upper link and a pair of laterally spaced apart lower links connected to be raised and lowered by the power lift, said planter comprising a hitch frame including a generally vertically extending standard, means forming a pair of laterally spaced apart socket members fixed to the lower portion of said standard, a transverse bar carried loosely in said socket members and having ends adapted to receive the rear ends of said lower links, means at the upper end portion of said standard to receive the rear end of said upper link, whereby vertical swinging of the upper and lower links serves to raise and lower said hitch frame, a transverse member connected to said socket members, a main frame pivotally connected with said transverse member, means acting between the upper portion of said vertical standard and the rear portion of said main frame for holding the latter in position relative to the hitch frame, a press wheel frame pivotally connected with said main frame for vertical movement relative thereto, and means including pin and slot means acting between the upper portion of said vertical standard and said press wheel frame for limiting the movement of the press wheel frame relative to said main frame.

References Cited in the file of this patent

UNITED STATES PATENTS

| | | |
|---|---|---|
| 650,922 | Wilbur | June 5, 1900 |
| 1,136,342 | Johnston | Apr. 20, 1915 |
| 1,202,227 | Sandifur | Oct. 24, 1916 |
| 1,202,669 | Cambron | Oct. 24, 1916 |
| 1,469,752 | Chase et al. | Oct. 2, 1923 |
| 1,865,800 | Strandlund | July 5, 1932 |
| 1,911,218 | White | May 30, 1933 |
| 2,063,852 | Ray | Dec. 8, 1936 |
| 2,269,987 | Raney et al. | Jan. 13, 1942 |
| 2,303,043 | Goodman | Nov. 24, 1942 |
| 2,495,928 | Geraldson | Jan. 31, 1950 |
| 2,500,064 | Foster | Mar. 7, 1950 |
| 2,624,256 | Todd | Jan. 6, 1953 |
| 2,685,241 | Silver et al. | Aug. 3, 1954 |
| 2,741,967 | Oehler et al. | Apr. 17, 1956 |